W. F. O'ROURKE.
FENDER.
APPLICATION FILED JAN. 13, 1912.
1,031,957.
Patented July 9, 1912.
2 SHEETS—SHEET 1.
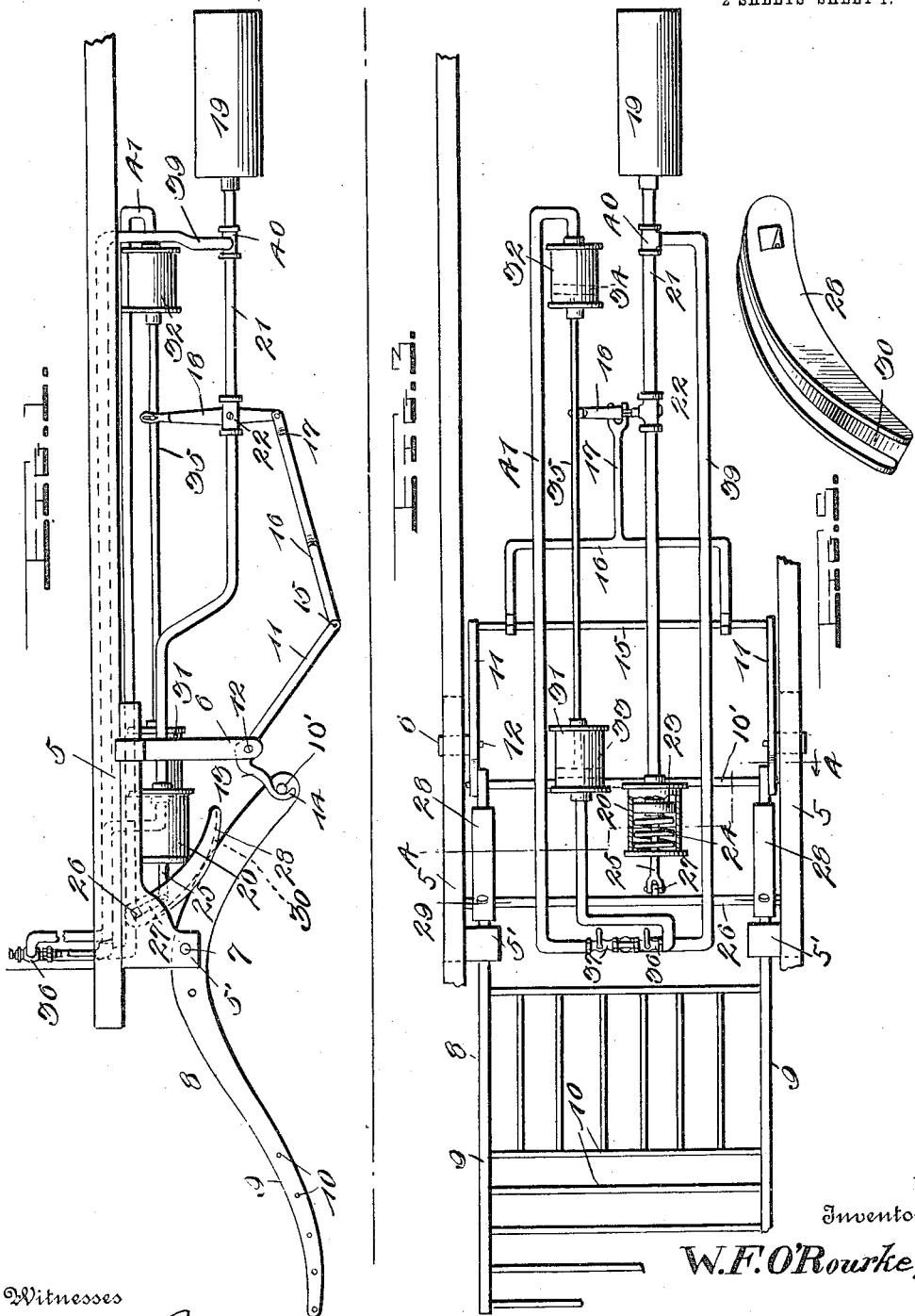
Witnesses
Chas. L. Griesbauer.
G. B. Norton.
Inventor
W. F. O'Rourke,
By Watson E. Coleman.
Attorney W. F. O'ROURKE.
FENDER.
APPLICATION FILED JAN. 13, 1912.
1,031,957.
Patented July 9, 1912.
2 SHEETS—SHEET 2.
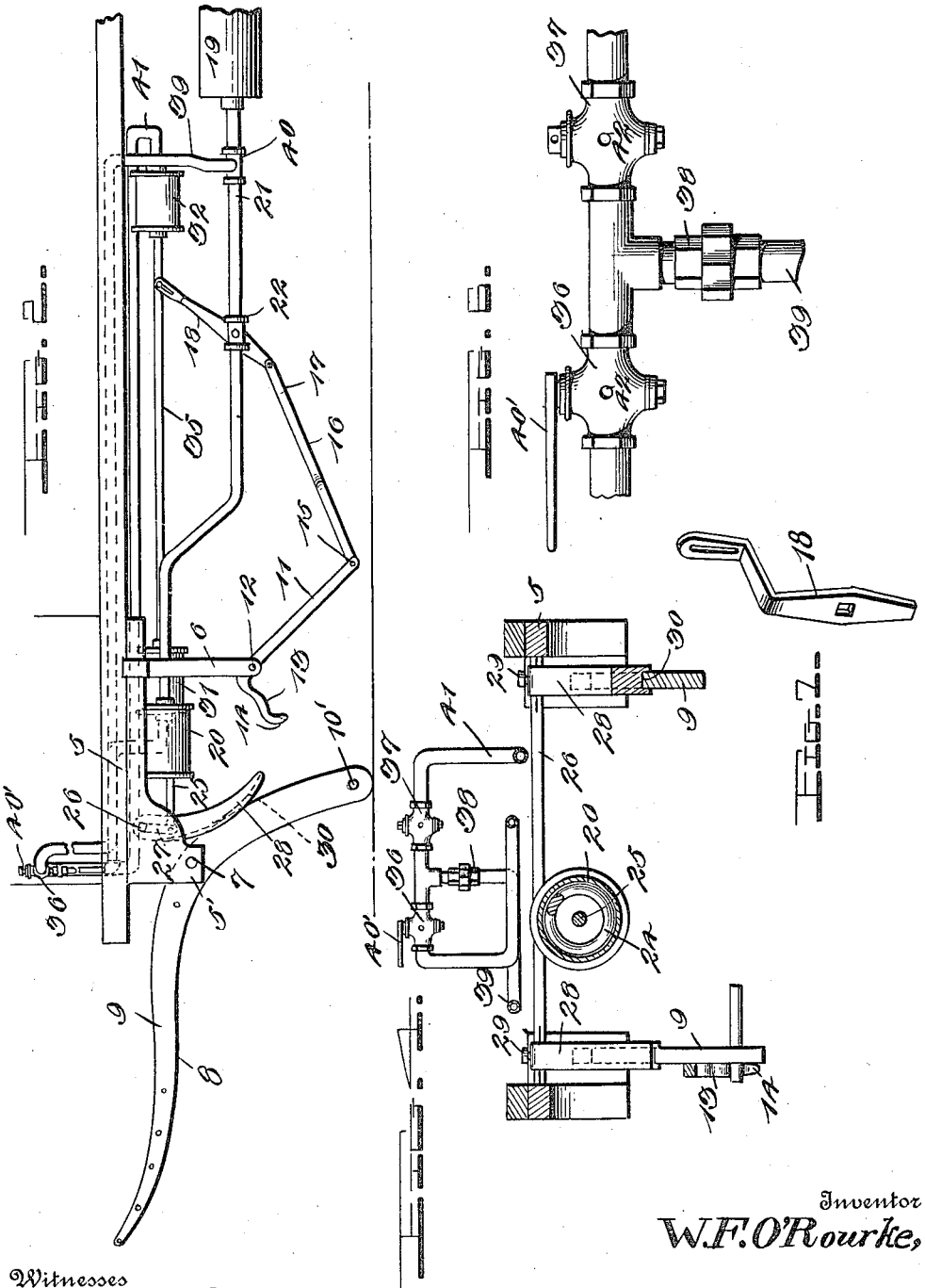
Inventor
W. F. O'Rourke,
Witnesses
Chas. L. Grieshauer.
A. B. Norton.
By Watson E. Coleman.
Attorney

UNITED STATES PATENT OFFICE.

WILLIAM FRANCIS O'ROURKE, OF PHILADELPHIA, PENNSYLVANIA.

FENDER.

1,031,957.  Specification of Letters Patent.  Patented July 9, 1912.

Application filed January 13, 1912. Serial No. 671,027.

*To all whom it may concern:*

Be it known that I, WILLIAM FRANCIS O'ROURKE, a citizen of the United States, residing at Philadelphia, in the county of Philadelphia and State of Pennsylvania, have invented certain new and useful Improvements in Fenders, of which the following is a specification, reference being had to the accompanying drawings.

This invention relates to improvements in fenders of that character commonly employed upon street cars and the present invention has for its primary object the provision of means for automatically positioning the fender when a person is thrown thereon to effectually eliminate all liability of the body falling off of the fender and in front of the wheels of the car.

Another object of the invention is to provide air actuated means which is automatically operated by the weight of a body striking upon the forward end of the fender whereby said fender is elevated to retain the body thereon.

A still further object of the invention is to provide a simple arrangement of elements operated by means of compressed air to elevate the fender, and an air controlling valve and means connecting the same to the fender whereby said valve is automatically opened by the body striking upon the fender to instantaneously actuate the elevating mechanism.

A still further object of the invention resides in the provision of means controlled by the operator whereby the actuating mechanism may be operated to elevate the fender in cases of emergency.

With the above and other objects in view, the invention consists of the novel features of construction, combination and arrangement of parts hereinafter fully described and claimed, and illustrated in the accompanying drawings, in which—

Figure 1 is a side elevation of a fender embodying the present invention showing the parts arranged in their normal positions; Fig. 2 is a similar view showing the forward end of the fender elevated; Fig. 3 is a top plan view; Fig. 4 is a section taken on the line 4—4 of Fig. 3; Fig. 5 is a detail perspective view of one of the cam arms; Fig. 6 is an elevation of the operator's air control valves. Fig. 7 is a detail perspective view of the valve operating lever.

While my improved fender is primarily adapted for use upon street railway cars, it will be understood that the same is also applicable to motor driven trucks or similar vehicles.

In the accompanying drawings 5 indicates the platform at one end of the car or other passenger vehicle to the opposite sides of which the depending brackets or supports 5' are fixed to which the hanger bars 6 are attached. To the depending supports 5' the ends of a transverse rod or shaft 7 are secured. Upon this shaft the fender 8 is loosely mounted for tilting movement in a vertical plane. This fender may be of any approved form but in the illustrated embodiment of the invention consists of the curved longitudinal side bars 9 which are connected by a plurality of cross bars or rods 10 upon which a wire or rope net may be arranged and secured in any desired manner.

Upon the lower ends of the hanger bars 6 the levers 11 are pivotally mounted as indicated at 12. The forward ends of these levers are angularly disposed as at 13 and terminate in the hooks 14 which are adapted to engage over the rear transverse rod or bar 10' which connects the longitudinal bars 8 of the fender. The levers 11 extend rearwardly and downwardly from the lower ends of the hanger bars 6 and are connected by means of the transverse rod 15. A U-shaped member 16 has its parallel longitudinally disposed arms fixed upon the rod 15. This member 16 includes a central longitudinally disposed rod 17, the end of which is pivotally connected to the lower end of a valve operating lever 18.

A compressed air reservoir 19 is suitably mounted beneath the floor of the vehicle and beneath the platform 5 a cylinder 20 is arranged. This cylinder is connected to the supply reservoir 19 by means of the pipe 21 in which a valve 22 is located. The valve operating lever 18 is centrally connected to the stem of this valve and extends above and below the supply pipe 21. In the cylinder 20 a plunger 23 is arranged and is yieldingly held for movement in one direction by means of a coiled spring 24. The plunger rod 25 extends through the forward end of the cylinder 20 and is pivotally connected to a laterally disposed arm 27 formed upon a transverse rock shaft 26 which is journaled at its ends in bearings provided in the brackets 5'. Upon the shaft 26 adjacent to the opposite ends thereof the cam arms 28 are rigidly fixed by means of the set screws 29. These arms are curved and are provided in one of their longitudinal edges with the grooves or channels 30 to receive the upper edges of the rearwardly and downwardly inclined ends of the longitudinal bars 8 of the fender.

As thus far described, the action of the device is as follows. The parts being in their normal positions, as shown in Fig. 1, upon the fender striking a body, the weight of the body falling upon the front end of the fender forces the angularly disposed arms 13 of the levers 11 upwardly, thereby pulling the member 16 forwardly and thus rotating the air controlled valve 22 through the medium of the lever 18 to open said valve and permit the compressed air to flow from the reservoir 19 into the cylinder 20. This compressed air then acts upon the plunger 23 to force the same forwardly in the cylinder against the tension of the spring 24, thereby rocking the shaft 26 and forcing the cam arms 30 downwardly and forwardly. These arms bearing against the longitudinal bars 8 of the fender at their rear ends, rock said fender upon the rod or shaft 7 to force the rear end thereof downwardly and its forward end upwardly. Thus the body upon the forward portion of the fender is elevated and all danger of the same rolling off of the fender and beneath the same is effectually overcome.

In addition to the above described automatically operating mechanism, I also provide means under the control of the motorman or operator whereby said mechanism may be actuated when for any reason the mechanism fails to operate in the manner above disclosed. This mechanism includes the spaced cylinders 31 and 32 in which the plungers 33 and 34 respectively are arranged, said plungers being connected by means of the rod 35. This plunger rod is connected at a point between the cylinders 31 and 32, to the upper end of the valve operating lever 18. The operator's controlling valves 36 and 37 are arranged upon a common supply head 38 which is connected by means of the pipe 39 to the valve 40 which is located in the main air supply pipe 21 connected to the reservoir 19. An interchangeable handle 40' is provided for application to the stems of the valves 36 and 37 whereby the same may be operated. The valve 37 is connected by means of the pipe 41 to the cylinder 32 to supply air thereto and move the plunger 34 to return the parts of the mechanism to their normal positions. The valve 40 being open, compressed air is supplied to the head 38 and upon the operator opening the valve 36, air is admitted to the forward end of the cylinder 31 to force the plunger therein rearwardly and thus move the rod 35 to oscillate the lever 18 and open the valve 22 whereupon air is admitted to the cylinder 20 and the fender actuating arms 28 are operated in the manner previously described to elevate the forward end of the fender. The casings of the valves 36 and 37 are provided with exhaust ports 42 so that the air may be exhausted from the pipes 39 and 41 and the cylinders 31 and 32.

From the foregoing it will be seen that I have devised a very simple and positively-operating, fender-actuating mechanism whereby the forward end of the fender is instantly elevated upon a body striking upon the same, and the rear portion of said fender is lowered into contact with the ground, thereby providing an additional safeguard and eliminating all possibility of the person caught in the fender from rolling off of the same and beneath the wheels of the vehicle. Owing to the simplicity of the mechanism, the same is comparatively light so that it requires but small air pressure to actuate the same.

It will be understood that if desired the means for manually controlling the mechanism may be eliminated as the same is not essential to the utility of the device, and is simply provided as an additional precaution.

It will be understood that the invention is susceptible of considerable modification in the form, proportion and arrangement of the various parts without departing from the essential feature or sacrificing any of the advantages of the invention.

Having thus described the invention what is claimed is:

1. In combination with a fender fulcrumed intermediate of its ends, fluid pressure controlled means adapted to elevate the forward end of the fender, and means engaged with the rear end of said fender and actuated thereby in the upward movement of the rear end of the fender to render said fluid controlled means operative.

2. In combination with a fender fulcrumed intermediate of its ends for tilting movement, pivoted members bearing against the rearwardly extending portion of the fender and adapted to elevate the forward end thereof, fluid pressure controlled means for actuating said pivoted members, and means engaged and actuated by the rear end of said fender in its tilting movement in one direction to supply the fluid pressure to said actuating means.

3. In combination with a fender mounted for vertical tilting movement, air-operated actuating mechanism therefor, and means for controlling the supply of air to the actuating mechanism, said latter means being automatically operated upon a body striking the fender to render the actuating means operative and elevate the forward end of the fender.

4. In combination with a fender mounted for vertical tilting movement, compressed air operated actuating mechanism for the fender, an air supply valve, and controlling means connected to said valve and automatically actuated by the fender upon a body striking thereon to render the actuating means operative and elevate the forward end of the fender.

5. In combination with a fender mounted for vertical tilting movement, cam elements co-acting with said fender to elevate the forward end thereof, actuating means for said cam elements, and means automatically operated by said fender upon a body striking upon the same to render the actuating means operative and elevate the forward end of the fender.

6. In combination with a fender, air actuated means adapted to elevate the forward end of the fender, and controlling means automatically actuated by the fender upon a body striking upon the same to render said actuating means operative.

7. In combination with a pivotally mounted fender, cam elements co-acting with said fender to elevate the forward end thereof, air operated means to actuate said cam elements, an air supply valve, and controlling means connected to said supply valve and actuated by said fender upon a body striking the same to open said valve and operate the cam actuating means to elevate the forward end of the fender.

8. In combination with a fender pivotally mounted for tilting movement, of cam arms acting upon said fender to elevate the forward end thereof, compressed air operated means for actuating said arms, an air supply valve, an operating lever for said valve, and connections between said lever and the fender to open said valve when a body strikes upon the fender whereby the cam actuating mechanism is operated to elevate the forward end of the fender.

9. In combination with a fender pivotally mounted for vertical tilting movement, a cam element co-acting with said fender to elevate the forward end thereof, air operated actuating means for said cam element, an air supply valve, and actuating means for said supply valve automatically operated upon a body striking the fender to open the valve whereby the cam actuating means is operated to elevate the forward end of the fender.

10. In combination with a fender pivotally mounted for vertical tilting movement, of a pair of cam arms engaging the rear end of said fender to tilt the same and elevate its forward end, fulcrumed levers engaged with said fender, air operated actuating means for the cam arms, an air supply valve, and means connecting said supply valve to said fulcrumed levers whereby the valve is automatically opened upon a body striking the fender to render the cam actuating means operative and elevate the forward end of the fender.

11. In combination with a fender mounted for tilting movement, compressed air operated actuating means therefor adapted to elevate the forward end of the fender, means adapted to automatically render said actuating means operative upon a body striking the fender, and additional means for manually controlling the supply of compressed air to said actuating means.

12. In combination with a fender pivotally mounted for vertical tilting movement, compressed air operated means adapted to tilt said fender and elevate its forward end, means to hold said fender in its normal position so as to cut off the supply of air to the operating mechanism, said latter means being automatically actuated by a body striking on the fender to simultaneously release the fender and supply air to the actuating means therefor whereby the forward end of the fender is elevated, and additional means under the control of the operator to actuate said fender-holding and valve-controlling means.

13. In combination with a fender fulcrumed intermediate of its ends for vertical tilting movement, fluid pressure controlled means coöperating with said fender rearwardly of its fulcrum and adapted to elevate the forward end thereof, and additional means engaged and actuated by the rear end of the fender in its upward movement caused by a body falling on the forward end of the fender to supply fluid pressure to said fender actuating means and elevate the forward end of the fender.

14. In combination with a fender fulcrumed intermediate of its ends for vertical tilting movement, a pivoted element engaging the rear end of said fender and adapted to elevate the forward end thereof, a fluid pressure actuated piston connected to said fender operating element, and means automatically actuated upon a body striking upon the forward end of the fender to supply fluid pressure to move the piston and thereby elevate the forward end of the fender.

In testimony whereof I hereunto affix my signature in the presence of two witnesses.

WILLIAM FRANCIS O'ROURKE.

Witnesses:
JAMES PETER McHUGH,
JOHN McCARTHY.